United States Patent
Wolf et al.

(10) Patent No.: US 11,207,964 B2
(45) Date of Patent: Dec. 28, 2021

(54) METHOD FOR CONTROLLING AN INTERNAL COMBUSTION ENGINE

(71) Applicant: Schaeffler Technologies AG & Co. KG, Herzogenaurach (DE)

(72) Inventors: Daniel Wolf, Heroldsberg (DE); Piergiacomo Traversa, Tuchenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/767,788

(22) PCT Filed: Nov. 30, 2018

(86) PCT No.: PCT/DE2018/100975
§ 371 (c)(1),
(2) Date: May 28, 2020

(87) PCT Pub. No.: WO2019/110048
PCT Pub. Date: Jun. 13, 2019

(65) Prior Publication Data
US 2020/0362783 A1    Nov. 19, 2020

(30) Foreign Application Priority Data

Dec. 4, 2017 (DE) ............... 10 2017 011 166.9
Jul. 18, 2018 (DE) ............... 10 2018 117 359.8

(51) Int. Cl.
*B60K 6/24* (2007.10)
*F02D 13/02* (2006.01)
*F02D 41/00* (2006.01)
*F02D 41/04* (2006.01)
*F02D 41/06* (2006.01)
*F01L 9/14* (2021.01)

(52) U.S. Cl.
CPC ............. *B60K 6/24* (2013.01); *F01L 9/14* (2021.01); *F02D 13/0207* (2013.01);
(Continued)

(58) Field of Classification Search
CPC ........... B60W 30/18018; F02D 41/042; F02D 41/065; F02D 2041/001; F02D 13/0226;
(Continued)

(56) References Cited

U.S. PATENT DOCUMENTS 5,899,828 A    5/1999  Yamazaki et al.
6,647,955 B1 *  11/2003  Sieber ............... F02D 13/0242
                                                        123/322
(Continued)

FOREIGN PATENT DOCUMENTS

DE    102004013168 A1    10/2005
DE    102006031572 A1    1/2007
(Continued)

*Primary Examiner* — Sizo B Vilakazi
(74) *Attorney, Agent, or Firm* — Mat

(57) ABSTRACT

The disclosure relates to a method for controlling an internal combustion engine. The internal combustion engine includes a cylinder and a piston, which runs in the cylinder, together delimiting a working chamber. The working chamber is supplied with fresh air from an intake section via an inlet valve and is connected to an exhaust manifold via exhaust valves. The internal combustion engine includes a variable valve actuation system for the actuation of the inlet valves, controlling the opening time and/or the closing time and/or the lift. A strategy for shutting down the internal combustion engine includes controlling the inlet valves of individual or all working chambers in such a way that the transfer of fresh air from the intake section to the exhaust manifold is reduced or avoided and that the drag torque of the intake combustion engine is reduced.

19 Claims, 4 Drawing Sheets

(52) U.S. Cl.
CPC ....... *F02D 41/009* (2013.01); *F02D 41/0047* (2013.01); *F02D 41/042* (2013.01); *F02D 41/062* (2013.01)

(58) Field of Classification Search
CPC ............... F02D 13/0207; F02D 13/023; F02D 13/0211; F02N 11/0822; F02N 11/0818; F02N 11/0833; F02N 11/0837; F02N 11/0814; F02N 11/0825; F02N 11/0844; F02N 11/084; F02N 11/0829
See application file for complete search history.

(56) References Cited

U.S. PATENT DOCUMENTS

| | | | |
|---|---|---|---|
| 2002/0043243 A1* | 4/2002 | Majima | F02D 41/0002 123/399 |
| 2005/0205049 A1* | 9/2005 | Lewis | F01L 13/0005 123/198 DB |
| 2005/0279323 A1* | 12/2005 | Lewis | F01L 13/0005 123/321 |
| 2007/0006831 A1 | 1/2007 | Leone et al. | |
| 2013/0080036 A1* | 3/2013 | Yamauchi | F02D 41/065 701/112 |
| 2014/0190426 A1 | 7/2014 | Carvignese et al. | |
| 2015/0166037 A1 | 6/2015 | Bergkoetter et al. | |

FOREIGN PATENT DOCUMENTS

| | | |
|---|---|---|
| DE | 102010041519 B3 | 12/2011 |
| DE | 102018117359 A1 | 6/2019 |
| DE | 102018117360 A1 | 6/2019 |
| EP | 2578462 A1 | 4/2013 |
| WO | 2019110049 A1 | 6/2019 |

* cited by examiner

METHOD FOR CONTROLLING AN INTERNAL COMBUSTION ENGINE

CROSS-REFERENCE TO RELATED APPLICATIONS

This application is the U.S. National Phase of PCT Application No. PCT/DE2018/100975 filed on Nov. 30, 2018 which claims priority to DE 10 2017 011 166.9 filed on Dec. 4, 2017 and DE 10 2018 117 359.8 filed on Jul. 18, 2018, the entire disclosures of which are incorporated by reference herein.

TECHNICAL FIELD

This disclosure relates to a method for controlling an internal combustion engine configured with a pinion starter.

BACKGROUND

Such a method is disclosed for example in EP 2 578 462 A1. A method is described for reducing pumping losses of an internal combustion engine, which is used in a hybrid drive train with a belt starter generator. Pumping losses are reduced while the internal combustion engine is in the shutdown state.

SUMMARY

The object of the disclosure is to propose a method which optimizes the operation of the internal combustion engine during a stop-start phase.

The object is achieved by a method having the features described herein. The disclosure relates to a method for controlling an internal combustion engine, the internal combustion engine comprising the following: a pinion starter for starting the internal combustion engine; a cylinder and a piston running in the cylinder, which together define a working chamber; the working chamber being supplied with fresh air by an intake manifold via an inlet valve and being connected via exhaust valves to an exhaust manifold; and, a system for variable actuation of the inlet valves, the system for variable actuation of the inlet valves of the internal combustion engine being controlled in such a way that the opening time and/or the closing time and/or the lift of the inlet valves is changed.

The following strategy is used when shutting down the internal combustion engine: The inlet valves of individual or all working chambers are controlled in such a way that the transfer of fresh air from the intake manifold to the exhaust manifold is reduced or avoided and that the drag torque of the internal combustion engine is reduced. Over-supplying the catalyst with fresh air can advantageously be avoided. Excessive fresh air supply means that fuel is injected to set the required air ratio by means of a mixture regulator to achieve the optimum air ratio. Avoiding or reducing fresh air transfer can result in reduced fuel consumption during the stop-start process. Another advantage is that drag torques are reduced. The drag torque of the internal combustion engine is understood as resistance that is caused by the frictional moving parts of the internal combustion engine and by the pushing and pulling of gases from/to a working chamber or combustion chamber (pumping losses). In particular, this can improve the comfort of the stop-start process.

A further development of the method which is advantageous in terms of the time for starting up can be achieved by using the following strategy when the internal combustion engine is shut down. The inlet valves of individual or all working chambers are controlled in such a way that the position of the piston can be controlled when the internal combustion engine is shut down; and, the end position of individual pistons can be controlled in such a way that a position which is advantageous for starting the internal combustion engine is achieved.

A further advantageous development relates to a method in which the position of the piston when the internal combustion engine is shut down is controlled in such a way that the piston is in the bottom dead center between the charging and compression strokes when the internal combustion engine is shut down, the working chamber being filled with fresh air. The time for the subsequent startup of the internal combustion engine can thus advantageously be shortened.

A further development which is advantageous in this respect relates to a method in which the opening time and/or the closing time and/or the stroke of the inlet valves of a first working chamber is controlled during the shutdown of the internal combustion engine in such a way that a piston which is assigned to a second working chamber is located in the subsequently shutdown state of the internal combustion engine at bottom dead center between the charging and compression strokes, the second working chamber being filled with fresh air.

A further development which is advantageous in this respect relates to a method in which the fresh air in the second working chamber is compressed when the internal combustion engine is started up immediately after beginning the start-up, converted into a fuel/fresh air mixture, and ignited.

A further advantageous development relates to a method, wherein the following strategy is used when the internal combustion engine is shut down. In a first step, a criterion is recognized which leads to the shutdown being interrupted. In a second step, the inlet valves of the working chambers which are in the exhaust cycle are activated in the next cycle in such a way that the working chamber is filled with fresh air, after which fuel is injected and the fuel-fresh air mixture is ignited in the compression cycle.

In particular in the case of internal combustion engines with direct injection, the internal combustion engine can thus be quickly restarted. The latest possible point to interrupt the shutdown depends among other things on the resonance of the overall system.

BRIEF DESCRIPTION OF THE DRAWINGS

The disclosure is explained below in the drawings.

DETAILED DESCRIPTION OF THE EMBODIMENTS

Figure 1:
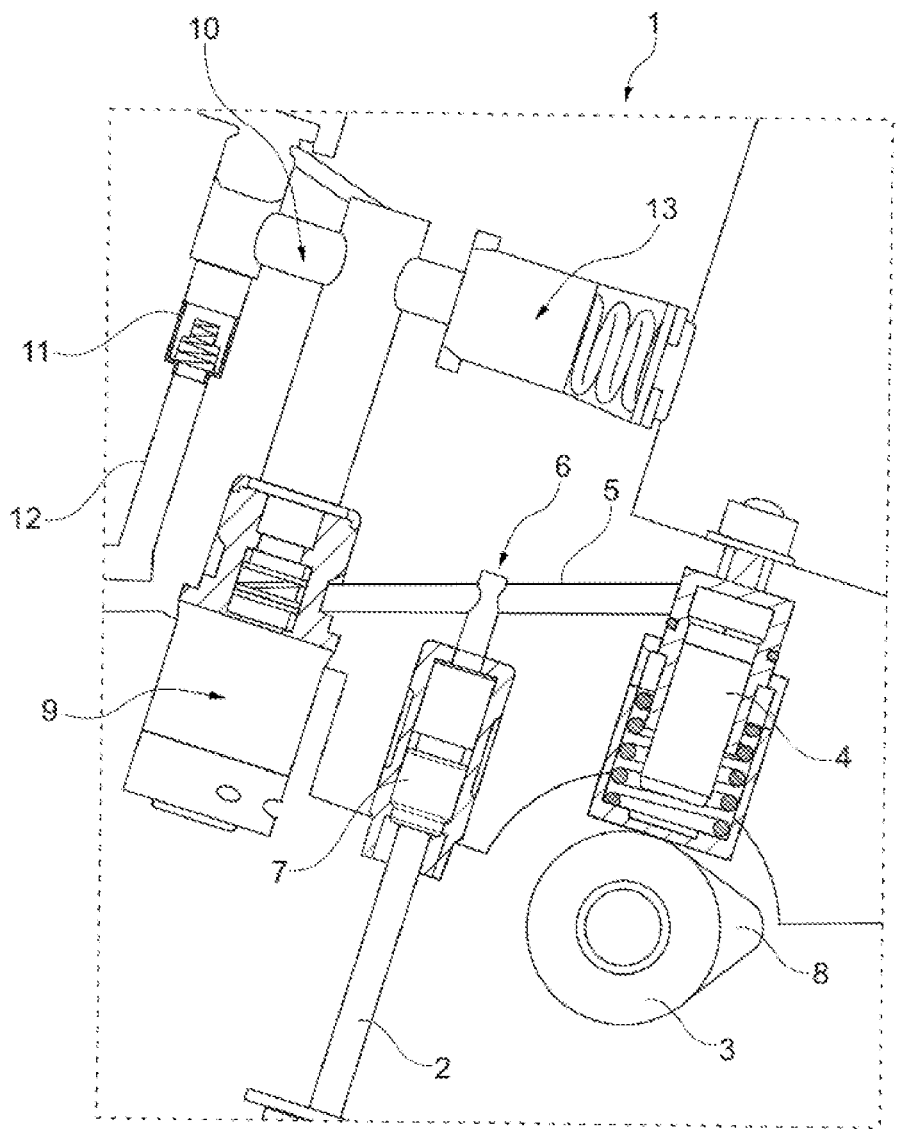
FIG. 1 shows a schematic representation of the structure of an electro-hydraulic valve train for variable actuation of the inlet valves of an internal combustion engine.

FIG. 1 shows a schematic representation of the structure 1 of an electro-hydraulic valve train for variable actuation of the inlet valves of an internal combustion engine. Inlet valves 2 can be controlled in such a way that the opening time, the closing time and the lift can be changed. A camshaft 3 drives a master piston 4, which is connected to a slave piston 7 via a hydraulic medium line 5 of a high-pressure chamber 6. The movement caused by a cam 8 of the camshaft 3 can be transmitted to an inlet valve 2 via the master piston 4, the hydraulic support in the high-pressure chamber 6, and the slave piston 7.

An electromagnetic switching valve 9 designed as a 2-2-way valve establishes a controllable hydraulic connection between the high-pressure chamber 6 and a medium-pressure chamber 10. When the switching valve 9 is open, hydraulic medium can flow from the high-pressure chamber 6 into the medium-pressure chamber 10. The medium pressure chamber 10 is connected to the general hydraulic medium circuit 12 of the internal combustion engine via a hydraulic medium line secured by a check valve 11. The medium pressure chamber 10 is connected to a piston pressure accumulator 13.

The variability of the opening time, the closing time and the lift of the gas exchange valve 2 is accordingly achieved by hydraulic coupling and decoupling that occurs between the cam 8 of the camshaft 3 and the gas exchange valve 2. The hydraulic coupling is provided by the high-pressure chamber 6, filled with hydraulic medium, between the master piston 4 and the slave piston 7—the high-pressure chamber 6 thus acts as a so-called hydraulic linkage. The displacement of hydraulic medium caused by the cam contour and implemented by means of master piston 4 acts—with a closed switching valve 9 and negligible leakage—proportional to the movement of the gas exchange valve 2 caused by the movement of the slave piston 7. The movement of the gas exchange valve 2 can be controlled in that a partial volume of the hydraulic medium is transferred from the high-pressure chamber 6 to the medium-pressure chamber 10 by deliberately opening the switching valve 9. The movement of the gas exchange valve 2 is no longer proportional to the contour of the cam 8, but can take any shape.

Figure 2:
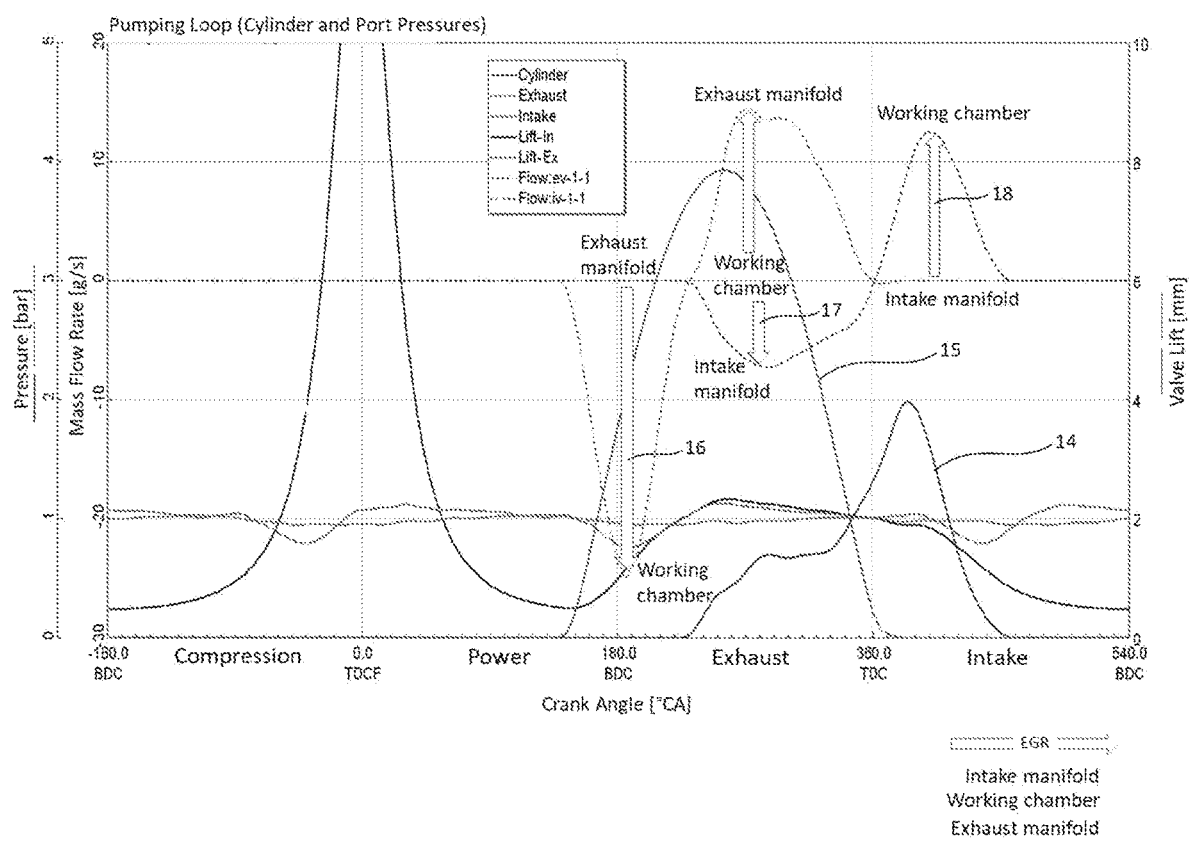
FIG. 2 shows a first characteristic valve lift curve of an inlet valve.

A first characteristic valve lift curve of an inlet valve is shown in FIG. 2. The axis of rotation of the crankshaft is shown on the abscissa axis, wherein two complete revolutions of the crankshaft are recorded. The piston then moves between bottom dead center BDC and top dead center TDC, with the internal combustion engine going through the compression (ignition), power, exhaust, and intake strokes. The valve lift and the gas mass flow are plotted on the ordinate axis.

Line 14 illustrates the valve lift curve of inlet valve 2. Inlet valve 2 opens during the exhaust stroke, at approximately 50° crankshaft angle after bottom dead center BDC. A first valve lift of the valve lift curve amounts to approximately 1.5 mm that dwells or plateaus near this lift up to approximately 30° crankshaft angle before reaching top dead center TDC and is therefore relatively small in comparison with the maximum lift. Then the valve lift curve increases to a second valve lift of 4 mm, for example. The inlet valve closes at approximately 460° crankshaft angle during the cycle before bottom dead center BDC is reached.

Line 15 illustrates the valve lift curve of the exhaust valve. The exhaust valve opens during power stroke at a 140° crankshaft angle, i.e., shortly before bottom dead center BDC is reached. The exhaust valve closes at the end of the exhaust stroke in the area of top dead center TDC. Together with the lift characteristics of the inlet valve, a mass flow is created between the exhaust manifold, the working chamber of the cylinder, and the intake manifold.

The mass flow between the exhaust manifold and the working chamber of the cylinder is illustrated by flow arrow 16, and the mass flow between the working chamber of the cylinder and the intake section by flow arrow 17. Flow arrow 18 illustrates the mass flow between the intake manifold and the working chamber. This course shows that exhaust gas is transferred from the exhaust manifold into the intake manifold, whereby exhaust gas recirculation is realized and a transfer of fresh air or a fresh intake charge from the intake manifold to the exhaust manifold is avoided or at least reduced. Pumping losses are also reduced, which reduces the drag torque caused by the internal combustion engine.

Figure 3:
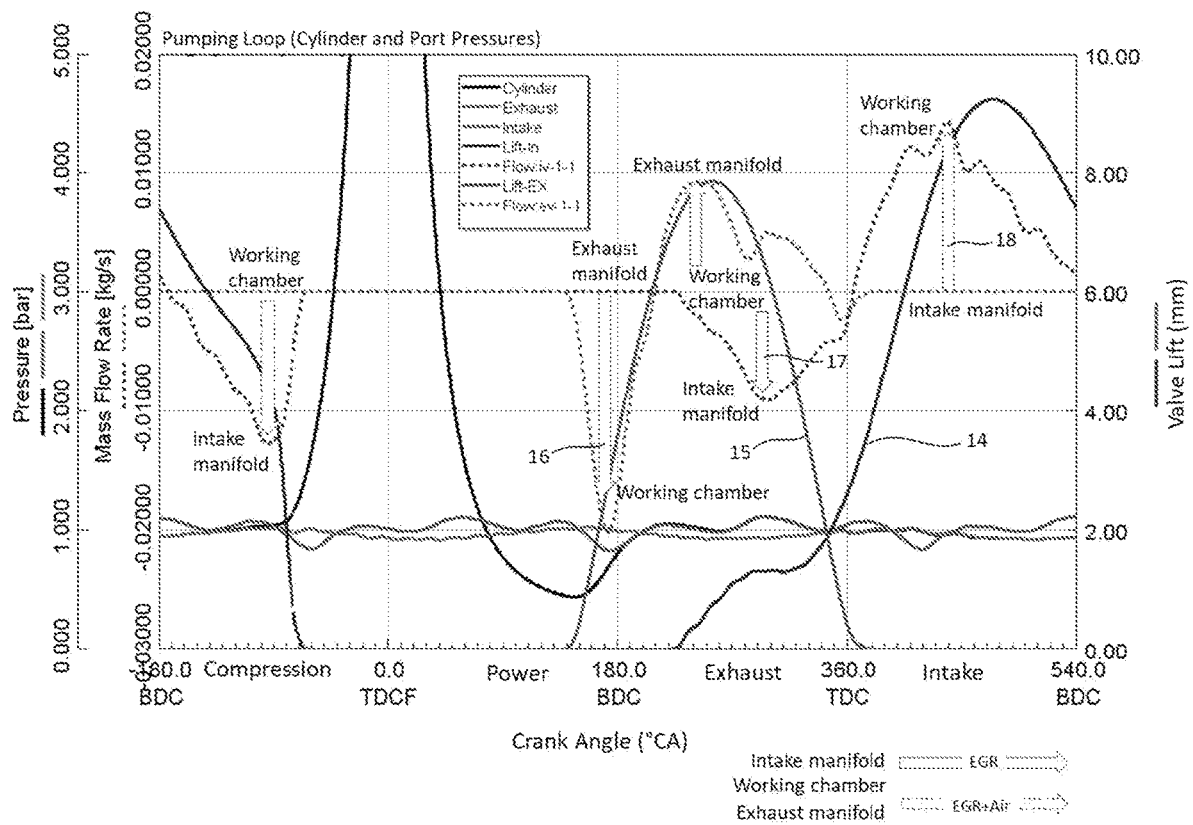
FIG. 3 shows a second characteristic valve lift curve of an inlet valve.

A second characteristic valve lift curve of an inlet valve 2 is shown in FIG. 3. The lift curves of the inlet and exhaust valves largely correspond to the curves shown in FIG. 2. However, the inlet valve closes at a −60° crankshaft angle shortly before top dead center TDC during the compression stroke. The maximum lift of the inlet valve also differs from the lift shown in FIG. 2 and is approximately 9 mm. The first characteristic valve lift curve is advantageous compared to the second characteristic valve lift curve with a view to reducing the transfer of fresh air from the intake manifold to the exhaust manifold, the second characteristic valve lift curve is advantageous compared to the first characteristic valve lift curve with a view to reducing drag torque.

The transfer of fresh air from the intake manifold to the exhaust manifold is accordingly reduced or avoided and the drag torque caused by the resistance of the piston movement is reduced by: 1) opening the inlet valves of individual or all working chambers at a time when the piston associated with the working chamber is in the exhaust stroke; 2) closing the inlet valves of individual or all working chambers at a time when the piston is in the intake stroke, such that the intake stroke is not yet completed; or, 3) closing the inlet valves of individual or all working chambers at a time when the piston is in the compression stroke, such that the compression stroke is not yet completed.

Figure 4A:
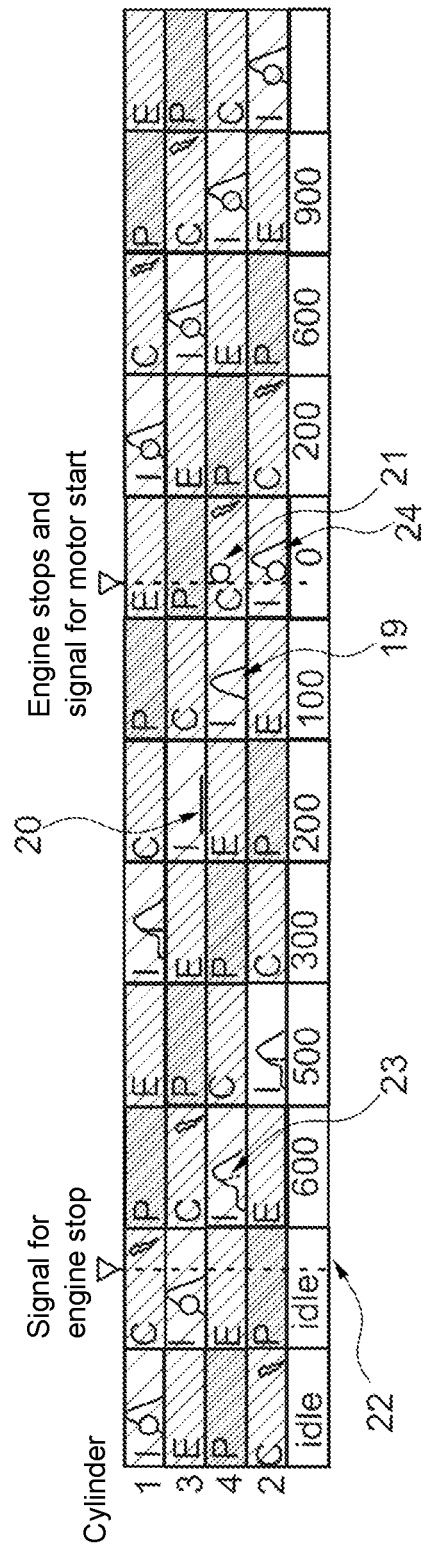
FIG. 4a shows a first method for shutting down and starting up an internal combustion engine.

FIG. 4a illustrates a method for shutting down and starting up an internal combustion engine, wherein the following strategy is used. After initiating the shutdown, for example in the stop-start mode, the inlet valves 2 are actuated in such a way that either the first characteristic or the second characteristic valve lift curve is established. As a result, the transfer of fresh air from the intake section to the exhaust manifold is reduced or avoided and the drag torque caused by the resistance of the piston movement is reduced. During the shutdown, the opening time and/or the closing time and/or the lift of the inlet valves of a first working chamber are controlled in such a way to manipulate, manage, or control a position of a piston assigned to a second working chamber, such that the piston stops at a bottom dead center position between the intake and compression strokes, with the second working chamber filled with fresh air (see 19). The inlet valve assigned to the first working chamber can also be controlled during the intake stroke, for example, in such a way that it does not open or is deactivated—thus the position of the piston assigned to the second working chamber can be controlled (see 20). When the internal combustion engine is then started up, the fresh air in the second working chamber can be compressed immediately after the start-up begins, being converted into a fuel/fresh air mixture and ignited (see 21). The time required to start the engine can be reduced in this way.

Regarding the other distinctive points of the strategy, the following description is provided.

Point 22: Calculation of the remaining kinetic energy of the engine and calculation of the control to stop the engine in a controlled position;

Point 23: Control of the inlet valve according to the first characteristic valve lift curve (FIG. 2) or according to the second characteristic valve lift curve (FIG. 3);

Point 20: Deactivation (no valve lift) of the inlet valve to control position after an engine stop signal has been received;

Point 21: Injection of fuel during the compression stroke and activation of the pinion starter; and Point 24: The type of control of the inlet valve is determined during engine stop.

Figure 4B:
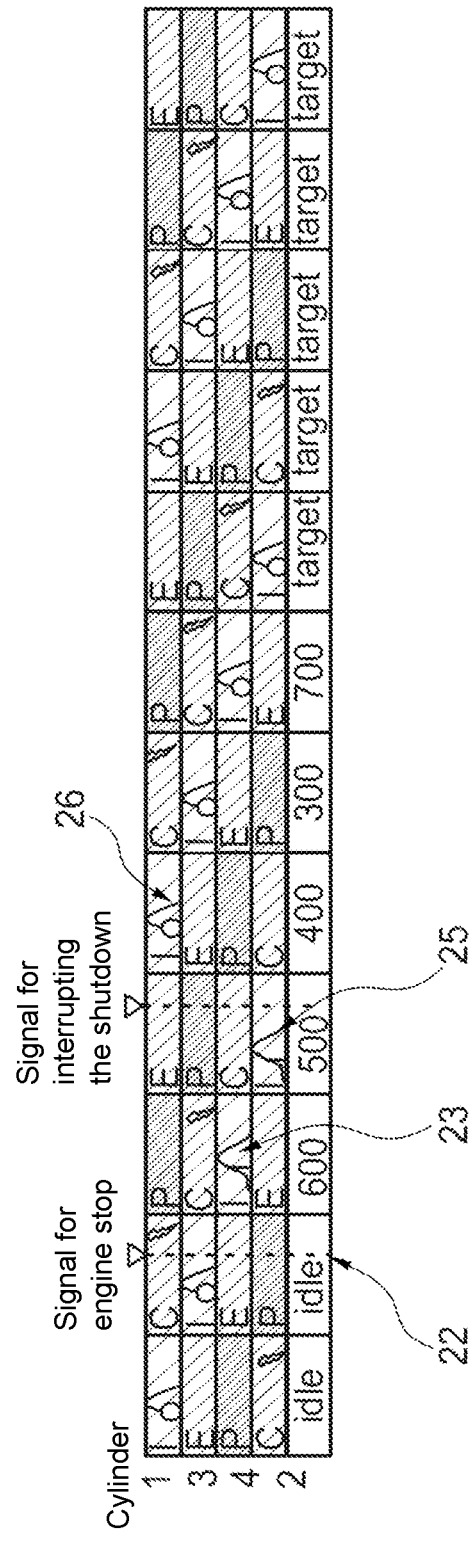
FIG. 4b shows a second method for shutting down and starting up an internal combustion engine in situations in which the shutdown is interrupted.

In certain driving situations, it can happen that the internal combustion engine shuts down, but an event occurs during the shutdown which should lead to the interruption of the shutdown, see FIG. 4b. In this so-called "change of mind" situation, the internal combustion engine should return to the target speed, i.e., the idling speed, as soon as possible. For this purpose, a criterion is defined, the occurrence of which leads to the shutdown being interrupted. One possible criterion is, for example, the driver actuating the clutch. After the criterion has entered and been recognized, the inlet valves of the working chambers which are in the exhaust cycle are activated in the subsequent charging cycle in such a way that the working chamber is filled with a fuel/fresh air mixture, wherein the fuel/fresh air mixture is then ignited in a compression cycle.

Regarding the other distinctive points of the strategy, the following description is provided.

Point 25: The intake charge contains too much exhaust gas and is therefore not ignitable; and Point 26: The type of activation of the inlet valve is determined as a result of the interrupt signal.

LIST OF REFERENCE CHARACTERS 1 electro-hydraulic valve train for variable actuation of the inlet valves
2 inlet valve
3 camshaft
4 master pistons
5 hydraulic medium line
6 high pressure chamber
7 slave pistons
8 cams
9 switching valve
10 medium pressure chamber
11 check valve
12 hydraulic medium circuit
13 piston pressure accumulators
14 line
15 line
16 flow arrow
17 flow arrow
28 flow arrow
19 second working chamber filled with fresh air
20 check the end position when the engine stops
21 starting the engine
22 calculation of the kinetic energy
23 actuation of the inlet valve
24 definition of control after engine start
25 intake charge with an excessive amount of exhaust gas
26 definition of control after engine start
BDC bottom dead center
TDC top dead center

The invention claimed is:

1. A method for controlling an internal combustion engine having a plurality of working chambers defined by a plurality of cylinders and a plurality of pistons, the method comprising:
   providing:
      a first cylinder:
      a first piston configured to move within the first cylinder, the first piston and the first cylinder defining a first working chamber, and the first working chamber configured to be fluidly connected to both an intake manifold via a first inlet valve, and an exhaust manifold via a first exhaust valve;
      a variable valve actuation system configured to control at least one of an opening time, a closing time, or a valve lift of an inlet valve lift curve;
   providing a shutdown signal to the internal combustion engine; and
   changing the inlet valve lift curve to a first inlet valve lift curve as engine speed decreases below an idle speed, the first inlet valve lift curve defining a first inlet valve opening event having a first valve lift and a second valve lift greater than the first valve lift.

2. The method of claim 1, wherein the first valve lift occurs during an exhaust stroke and the second valve lift occurs during an intake stroke, the exhaust stroke and intake stroke defining two strokes of a four-stroke engine cycle of the internal combustion engine.

3. The method of claim 1, wherein the first valve lift is smaller than the second valve lift.

4. The method of claim 3, wherein the first valve lift is smaller than a valve lift of the first exhaust valve.

5. The method of claim 1, wherein the first inlet valve lift curve defines a closing of the first inlet valve before a bottom dead center position of the first piston within an intake stroke of a four-stroke engine cycle of the internal combustion engine.

6. The method of claim 1, wherein the first inlet valve lift curve defines a closing of the first inlet valve at a first piston location of less than 90 crank angle degrees from a top dead center position of the first piston in a compression stroke of a four-stroke engine cycle of the internal combustion engine.

7. The method of claim 1, wherein the first inlet valve lift curve defines an opening of the first inlet valve at a first piston location of less than 90 crank angle degrees from a bottom dead center position of the first piston in an exhaust stroke of a four-stroke engine cycle of the internal combustion engine.

8. The method of claim 1, wherein the first inlet valve lift curve controls a shutdown position of the internal combustion engine.

9. The method of claim 8, further comprising calculating a kinetic energy of the internal combustion engine before changing to the first inlet valve lift curve.

10. The method of claim 1, wherein the first inlet valve lift curve controls a position of a second piston so that the second piston stops proximate to a bottom dead center position between an intake stroke and a compression stroke of a four-stroke engine cycle of the internal combustion engine.

11. The method of claim 10, wherein a second working chamber between the second piston and a second cylinder is filled with fresh air.

12. The method of claim 11, wherein the fresh air in the second working chamber is ignited during a subsequent compression stroke of the second piston following an engine start-up signal.

13. The method of claim 1, further comprising deactivating a second inlet valve of a second working chamber as engine speed is decreasing below idle speed.

14. The method of claim 1, further comprising recognizing a criterion for interruption of shutting down of the internal combustion engine and selecting a second inlet valve lift curve for inlet valves of any of the plurality of working chambers in an exhaust stroke so that a subsequent intake stroke brings in fresh air, the fresh air configured to be converted into a fuel/fresh air mixture and ignited in a subsequent compression stroke, the exhaust stroke and compression stroke defining two strokes of a four-stroke engine cycle of the internal combustion engine.

15. The method of claim 1, wherein the first inlet valve lift curve defines an inlet valve opening at a first crankshaft angle and a maximum lift of the first exhaust valve occurs at a second crankshaft angle, the first crankshaft angle occurring before the second crankshaft angle within an exhaust stroke of a four-stroke cycle of the internal combustion engine.

16. A method of shutting down an internal combustion engine, the internal combustion engine having a plurality of working chambers, and each working chamber defined by one of a plurality of cylinders configured to receive one of a plurality of pistons, the method comprising:
    providing:
        a first cylinder;
        a first piston configured to move within the first cylinder, the first piston and the first cylinder defining a first working chamber, and the first working chamber configured to cooperate with the first piston, an inlet valve, and an exhaust valve to fulfill a gas exchange process for the internal combustion engine;
        a variable valve actuation system configured to control at least one of an opening time, a closing time, or a valve lift of an inlet valve lift curve;
    providing a shutdown signal to the internal combustion engine; and
    changing the inlet valve lift curve to a first inlet valve lift.

17. The method of claim 16, wherein the changing the inlet valve lift curve to the first inlet valve curve changes a drag toque of the internal combustion engine such that one of the plurality of pistons is stopped n a pre-determined position relative to a four-stroke cycle of the internal combustion engine, and the pre-determined position is proximate to a bottom dead center position between an intake stroke and a compression stroke of the four-stroke cycle.

18. A method of shutting down an internal combustion engine, the internal combustion engine having a plurality of working chambers, and each of the plurality of working chambers defined by one of a plurality of cylinders configured to receive one of a plurality of pistons, the method comprising:
    providing:
        a first cylinder;
        a first piston configured to move within the first cylinder, the first piston and the first cylinder defining a first working chamber, and the first working chamber configured to cooperate with the first piston, an inlet valve, and an exhaust valve to fulfill a gas exchange process for the internal combustion engine;
        a variable valve actuation system configured to control at least one of an opening time, a closing time, or a valve lift of an inlet valve lift curve;
    providing a shutdown signal to the internal combustion engine; and
    changing the inlet valve lift curve to a first inlet valve lift curve, the first inlet valve lift curve defining a first inlet valve opening event having:
        a first valve lift;
        a second valve lift different than the first valve lift; and
        a plateau arranged between the first and second valve lifts.

19. The method of claim 18, wherein the first inlet valve lift curve: i) increases an amount of exhaust gas recirculation delivered to at least one of the plurality of working chambers during an intake stroke; and, ii) reduces a drag torque of the internal combustion engine to stop one of the plurality of pistons in a pre-determined position relative to a four-stroke cycle of the internal combustion engine.

* * * * *